United States Patent Office 3,271,363
Patented Sept. 6, 1966

3,271,363
EPOXIDE RESIN PROCESS AND COMPOSITION
Otho Leroy Nikles, Toms River, N.J., assignor to Ciba Corporation, New York, N.Y., a corporation of Delaware
No Drawing. Filed July 19, 1962, Ser. No. 211,127
12 Claims. (Cl. 260—47)

This invention relates to epoxy resin compositions and a method for producing same. Epoxy resins are well-known in the plastic art and are valuable in the manufacture of coatings, molding resins, adhesives, and the like. The present invention provides a method for producing epoxy resins which have excellent color, clarity and high adhesion properties. By means of applicant's novel process higher molecular weight 1,2-epoxy resins can readily be obtained from lower molecular weight epoxy resins, the higher molecular weight resins so produced, being readily reproducible, essentially linear in character, having relatively definite melting points, solvent solubility, and being curable to solid infusible products.

It has already been proposed to prepare high molecular weight epoxy resins by reacting an initial low molecular weight or melting point epoxy resin with a dihydric phenol. According to the prior art processes the initial low molecular weight epoxide resin is first produced by reacting a dihydric phenol, such as bisphenol A (4,4'-dihydroxydiphenyldimethyl methane), with epichlorhydrin or glycerol dichlorhydrin in the presence of caustic alkali, then adding to the low molecular weight epoxy resin thus formed a dihydric phenol and effecting the reaction of dihydric phenol with the initial epoxy resin in the presence of an alkali metal hydroxide, like sodium hydroxide or a metal salt, like sodium acetate to form a higher melting point or higher molecular weight epoxy resin.

However, all attempts to effect this advancement of a low molecular weight epoxy resin to a high molecular weight resin in the presence of such alkaline catalysts have generally proven to be unsuccessful or erratic. This is due in part to the presence in most commercial resins of appreciable amounts of labile organic chlorine as chlorhydrin. Catalysts like sodium hydroxide or potassium hydroxide, when used in catalytic quantities, react with the labile chlorhydrin groups to form the corresponding sodium or potassium chlorides which are ineffective as catalysts. When larger quantities are used of either of these hydroxides, uncontrolled and erratic condensation and polymerization leading to branch formation occurs. When the alkali metal hydroxide is used in a quantity of 0.1 percent or more, based on the weight of the reactants, gelation sets in immediately, and thermosetting, infusible and insoluble resins are obtained. In the absence of catalysts the reaction is slow and, even if carried out at high temperatures, is generally incomplete. The products are dark in color and generally contain branched chain or undesired polymeric products.

It has now surprisingly been found that an effective, advantageous process is achieved when as the catalyst a calcium-salt, that is, salt yielding calcium ions in the reaction mixture, such as calcium chloride, is used.

Accordingly, the invention provides a process for producing essentially linear 1,2-epoxy resins of higher molecular weight and higher melting point from low molecular weight low melting point 1,2-epoxy resins, which comprises reacting a low molecular weight 1,2-epoxy resin with a dihydric phenol in the presence of a calcium salt, preferably of calcium chloride.

The process of the invention yields higher molecular epoxy resin with a molecular weight approximately the same as a theoretical molecular weight of a linear epoxy resin calculated from the proportions of reactants used. The resins obtained by the practice of the invention are characterized by the fact that they provide a desirably light color when employed in industrial applications, such as coatings, and by their excellent stability, produced when a long, slow cooldown of the reaction mixture is employed following completion of the reaction.

The practice of the invention offers the further advantages over the hitherto-known procedures that the process using a calcium salt exhibits less drifting and less polymerization of the resin produced. In addition, it is possible to employ the calcium salt in greater amounts than have been possible with previously-used catalysts, thereby making it possible to accelerate the advancement of the low molecular weight resins while still keeping the process under accurate control. As a corollary of this desirable feature, the process employing a calcium salt does not require as close control of the amount of catalyst which is employed. Further, it may be noted that the process employing calcium chloride is more advantageous from a practical viewpoint, both because of economic considerations and because, when calcium salts are employed as catalysts for the advancement of low molecular weight resins, products of excellent stability, not possible with previously-used catalysts or with barium or strontium chloride, are obtained. Finally, the percentage of chlorine present in the epoxy resin which is employed has no effect on the course of the reaction. Hence, it is immaterial to the successful practice of this invention what the chlorine content of the resin is and resins having either low or high chlorine content can be employed. Therefore, it is not necessary to compensate for the presence of excess chlorine as is necessary when other catalysts are employed.

It has been found that this condensation can be carried out with good success also in the presence of inorganic salts, organic chlorine or chlorhydrin. The presence of inorganic salts affects the rate of reaction but has little effect on the degree of reaction.

Lower epoxy resins having molecular weights ranging from about 340 to above 1000 have been used in the reaction. It is preferred, however, to employ lower epoxy resins having molecular weight ranging from about 340 to 440, since these lower molecular weight resins are more easily obtained free from the salt and other by-products of manufacture. The lower the molecular weight the less resin has to be processed through the purification steps and this results in lower over-all costs. Depending on the ratio of dihydric phenol to the lower molecular weight epoxy resin employed, higher epoxy resins with molecular weights of from about 500 to 6000 (epoxy content of 4.0 to 0.4 epoxide equivalent/kg.) have been readily obtained.

Any low molecular weight 1,2-epoxy compound can be employed as the starting material. There may be used, for example, epoxidated diolefines, dienes or cyclic dienes, such as butadiene dioxide, 1:2:5:6-epoxide-hexane and 1:2:4:5-diepoxy-cyclohexane; epoxidated diolefinically unsaturated carboxylic acid esters, such as methyl-9:10:12:13-diepoxy-stearate; the dimethyl ester of 6:7:10:11-diepoxy-hexadecane-1:16-dicarboxylic acid; epoxidated compounds containing two cyclohexenyl groups, such as diethylene glycol bis-(3:4-epoxy-cyclohexane carboxylate) and 3:4-epoxy-cyclohexylmethyl-3:4-epoxy-cyclohexane carboxylate. There may also be mentioned such as are obtainable by reacting a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid and especially from aromatic dicarboxylic acids, such as phthalic acid, isophthalic acid, terephthalic acid, 2:6-naphthylene-dicarboxylic acid, diphenyl-ortho:ortho'-dicarboxylic acid, ethylene glycol bis-(para-carboxyphenyl)-ether or the like. There may be mentioned, for example, diglycidyl adipate and diglycidyl phthalate. There are preferably used diglycidyl esters which substantially correspond to the formula

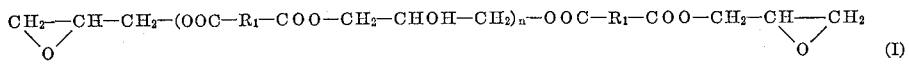

in which $R_1$ represents an aromatic hydrocarbon radical, and $n$ has the average value zero to 2.

There may also be used polyethers containing two epoxide groups, such as are obtainable by etherifying a dihydric alcohol or diphenol with epichlorhydrin or dichlorhydrin in the presence of an alkali. These compounds may be derived from glycols, such as ethylene glycol, diethylene glycol, triethylene glycol, propylene glycol-(1:2)-, propylene glycol-(1:3)-, butylene glycol-(1:4), pentane-1:5-diol, hexane-1:6-diol and especially from diphenols, such as resorcinol, pyrocatechol, hydroquinone, 1:4-dioxynaphthalene, bis-(4-hydroxyphenyl)-methane, bis-(4-hydroxyphenyl)-methylphenyl-methane, bis-(4-hydroxyphenyl)-tolyl-methane, 4:4'-dihydroxydiphenyl, bis-(4-hydroxyphenyl)-sulfone and especially 2:2-bis-(4-hydroxyphenyl)-propane. There may be mentioned etheylene glycol diglycidyl ether and resorcinol diglycidyl ether. There are preferably used diglycidyl ethers which substantially correspond to the formula

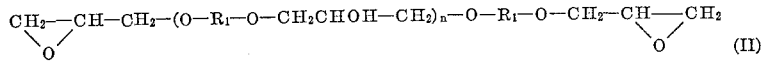

in which $R_1$ and $n$ have the meanings given for Formula I.

Especially useful as starting compounds are diglycidyl ethers which substantially correspond to the formula

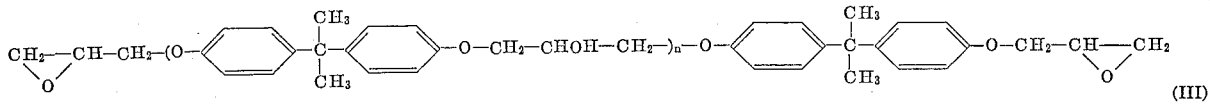

in which $n$ has the average value zero to 2, and more especially zero to 0.5.

As dihydric phenols which are used in the instant process there may be mentioned resorcinol, pyrocatechol, hydroquinone, 1:4-dihydroxy-naphthalene, bis-(4-hydroxyphenyl)-methane, bis-(4-hydroxyphenyl)-methyl-phenylmethane, bis-(4-hydroxyphenyl)-tolylmethane, 4:4'-dihydroxy-diphenyl, bis-(4-hydroxyphenyl)-sulfone and especially bisphenol A. Thus, bisorthocresol diglycidyl ether can readily be condensed with bisorthocresol or bisphenol A by the new process. Likewise, bisphenol A diglycidyl ether can be condensed with bisorthocresol. Because of their ready availability, the process is especially applicable to the conversion of low molecular weight, 1,2-epoxy resins or polyglycidyl ethers obtained from bisphenol A and epichlorhydrin to higher molecular weight epoxy resins with bisphenol A.

It has been found, however, that in general all kinds of 1,2-epoxy resins of lower molecular weight can be converted into essentially linear epoxy resins of higher molecular weight when they are reacted with dihydric phenols in the presence of even trace amounts of calcium salts. The calcium salts can be derived from both inorganic and organic acids. Any calcium salt which yields calcium ions in the reaction mixture can be employed.

Examples of calcium salts that have been found effective are the calcium halides, such as calcium bromide, calcium iodide and, particularly, calcium chloride, calcium acetate, calcium carbonate, calcium formate, calcium lactate and calcium nitrate. The calcium salt is employed in catalytic amount, the range employed being from about 20 parts to about 600 parts per million based on the dihydric phenol employed with from about 40 to about 240 parts per million representing the preferred range for commercial operations. The optimum range of calcium salt employed is from about 120 to 180 parts per million parts of dihydric phenol. While higher proportions of calcium salt can be employed, sufficient appreciable improvement is not effected after the amount of 240 parts per million has been reached to warrant the use of greater quantities in customary commercial operations and, in fact, the use of excessive amounts of salt, while still bringing about the desired condensation, produces resins having a degree of turbidity which renders them commercially unattractive for certain purposes, such as the provision of resins for use in coating compositions.

The temperature at which the reaction is carried out may be varied since the temperature affects only the reaction rate until the hydroxyl groups of the dihydric phenol are consumed. In general, a temperature ranging from about 140° to 195° C., depending on the melting point and viscosity of the final resin being prepared, is preferred. At temperatures under 140° C. the reaction is at a considerably reduced rate.

Thus, applicant's process employing calcium salts permits condensation without branch formation. When, for example, amounts of calcium chloride corresponding to 120 parts of calcium ion per million parts of bisphenol A are used in the condensation of a diglycidyl ether of bisphenol A (epoxy value of 5.3 epoxide equivalents/kg.) and bisphenol A at a temperature of 160–165° C., the reaction proceeds smoothly forming a linear epoxy resin of high molecular weight. The rate of condensation is directly proportional to the temperature. To insure the production of a linear polymer and at the same time to provide completion of the reaction within a short time, it is desirable to carry out the reaction at a high temperature and then control it by dropping the temperature just prior to the consumption of the dihydric phenol. A feature of the invention is that the reaction can be carried out with reactants which can be of commercial grade and need not be absolutely pure, for example, free from organic and inorganic chlorides. Thus, commercial or technical grades of the epoxy resins, such as polyglycidyl ethers of bisphenol A, and of the dihydric phenols, such as bisphenol A, can be employed.

The amount of dihydric phenol employed in proportion to the epoxy resin employed dictates the degree of polymerization or condensation obtained. In general, less than one hydroxyl equivalent of the dihydric phenol per epoxide equivalent of the epoxy resin is used.

The following examples will serve to illustrate the invention, the parts being by weight:

EXAMPLE 1

2,000 parts of an epoxy resin made by reacting epichlorhydrin with bisphenol A in the usual manner and having an epoxy content of 5.2–5.3 epoxide equivalents/kg. and a molecular weight of about 380 are mixed with 845 parts of bisphenol A and heated to a temperature of about 150° C. and an amount of calcium chloride sufficient to provide a calcium ion concentration of 40 parts per million is added in the form of a 20% aqueous solution. The mixture is heated to a temperature of 180–185° C. under a reduced pressure of 25–30 mm. of mercury and maintained under these conditions until an epoxy value for the resin of 1.17–1.20 equivalents/kilogram is obtained. The temperature is then lowered to 150° C. over a two-hour period and held at this temperature for two hours. The resin is then discharged rapidly into trays and allowed to cool. The resin has the properties reported in Table I below.

The above procedure is repeated employing amounts of calcium chloride sufficient to provide calcium ion concentrations of 80, 120, 160 and 240 parts per million. The properties of the resins obtained are reported in Table I.

*Table I*

|  | Control [1] | Calcium Concentration, p.p.m. | | | | |
|---|---|---|---|---|---|---|
|  |  | 40 | 80 | 120 | 160 | 240 |
| Reaction Time,[2] hrs | 2.6 | 6 | 4 | 3 | 3 | 3 |
| Epoxy value at end of reaction time, eq./kg | 1.16 | 1.18 | 1.18 | 1.16 | 1.18 | 1.13 |
| Epoxy value after cooling to 150° C., eq./kg | 0.93 | 1.03 | 1.06 | 1.08 | 1.09 | 1.08 |
| Epoxy value after 2 hour hold at 150° C., eq./kg | 0.91 | 0.95 | 1.01 | 1.04 | 1.05 | 1.04 |
| Final Properties: |  |  |  |  |  |  |
|   Epoxy value, eq./kg | 0.88 | 0.94 | 1.01 | 1.04 | 1.05 | 1.04 |
|   Softening point, ° C | 110 | 108 | 106 | 102 | 100.5 | 102 |
|   Viscosity in butyl carbitol | W | V–W | U–V | T–U | T–U | U |
|   Color | 1–2 | 1–2 | 1–2 | 1–2 | 1–2 | 1–2 |

[1] The control employs lithium chloride at a concentration of 44 parts per million based on bisphenol A.
[2] The reaction time is measured from the time of catalyst addition at 150° C. until an epoxy value of 1.115–1.20 eq./kg. is obtained.

EXAMPLE 2

The same procedure is employed as in Example 1, except that sufficient calcium chloride was employed to provide a concentration of 160 parts of calcium ion per million parts of bisphenol A. Three runs were made, employing epoxy resins having, respectively, hydrolyzable chlorine contents of 0.066%, 0.31% and 0.6%. The results of these runs are recorded in Table II.

*Table II*

| Hydrolyzable Chlorine Content, Percent | 0.066 | 0.31 | 0.6 |
|---|---|---|---|
| Reaction time, hrs | 2 | 3 | 4 |
| Epoxy value at end of reaction time, eq./kg | 1.12 | 1.18 | 1.18 |
| Epoxy value after cooling to 150° C., eq./kg | 1.06 | 1.09 | 1.08 |
| Epoxy value after 2 hour hold at 150° C., eq./kg | 1.02 | 1.05 | 1.05 |
| Final properties: |  |  |  |
|   Epoxy value, eq./kg | 1.01 | 1.05 | 1.04 |
|   Softening point, ° C | 103.5 | 101 | 102 |
|   Viscosity in butyl carbitol | U | T–U | U |
|   Color | 1–2 | 1–2 | 1–2 |

EXAMPLE 3

2,000 parts of an epoxy resin made by reacting epichlorhydrin with bisphenol A in the usual manner and having an epoxy content of 5.2–5.3 epoxide equivalents/kg. are charged to a reaction kettle under a reduced pressure of 25–30 mm. of mercury and heated to 135° C. 560 parts of bisphenol A are then added and the mixture heated to 145–150° C. At this point, 0.25 part of calcium chloride in the form of a 20% aqueous solution are added and the resulting reaction mixture is heated to 160–165° C. and held at this temperature for approximately 3 hours, until an epoxy value of 2.2–2.25 equivalents/kg. is obtained. The resin thus obtained is cooled to 150° C. over a period of 2 hours and held at this temperature for a further 2 hours. It is then discharged rapidly into trays and permitted to cool. The resin thus obtained had the following properties:

| | |
|---|---|
| Epoxy value _____ eq./kg__ | 2.11 |
| Softening point _____ ° C__ | 70 |
| Viscosity in butyl Carbitol _____ | E–F |
| Color _____ | 1–2 |
| Viscosity at 130° C., cps. _____ | 1,100 |
| Anhydride pot life at 130° C. _____ minutes__ | 98 |

EXAMPLE 4

2,000 parts of an epoxy resin made by reacting epichlorhydrin with bisphenol A in the usual manner and having an epoxy content of 5.2–5.3 epoxide equivalents/kg. are charged to a reaction kettle under a reduced pressure of 25–30 mm. of mercury and heated to 135° C. 1,000 parts of bisphenol A are then added and the mixture heated to 150° C. At this point, 0.45 part of calcium chloride in the form of a 20% aqueous solution are added and the resulting reaction mixture is heated to 185–190° C. and held at this temperature for approximately 3 hours, until an epoxy value of .58–.63 equivalent/kg. is obtained. The resin thus obtained is cooled to 150° C. over a period of 2 hours and held at this temperature for a further 2 hours. It is then discharged rapidly into trays and permitted to cool. The resin thus obtained had the following properties:

| | |
|---|---|
| Epoxy value _____ eq./kg__ | .55 |
| Softening point _____ ° C__ | 127 |
| Viscosity in butyl Carbitol _____ | Z–$Z_1$ |
| Color _____ | 2 |

EXAMPLE 5

The procedure of Example 1 is repeated, employing a sufficient amount of each of the calcium salts listed in Table III below, to provide a calcium ion concentration of 160 parts per million parts of bisphenol A. The results of these several runs are recorded in Table III.

*Table III*

| Inorganic Calcium Salts | Calcium Chloride | Calcium Bromide | Calcium Iodide | Calcium Carbonate | Calcium Nitrate |
|---|---|---|---|---|---|
| Reaction Time, hrs | 3 | 3 | 1.5 | 7 | 4 |
| Final properties: |  |  |  |  |  |
|   Epoxy value, eq./kg | 1.05 | 1.06 | 1.02 | 0.92 | 1.00 |
|   Softening point, ° C | 101 | 102 | 104 | 115 | 114 |
|   Viscosity | T–U | U | U | X–Y | X |
|   Color | 2 | 2 | 2 | 2 | 2 |

What is claimed is:

1. A process for producing essentially linear 1,2-epoxy resins having an epoxy equivalency greater than 1 of higher molecular weight and higher melting point from low molecular weight, low melting point 1,2-epoxy resins having an epoxy equivalency greater than 1, which comprises reacting a low molecular weight 1,2-epoxy resin having an epoxy equivalency greater than 1 with a dihydric phenol free from reactive groups other than phenolic hydroxyl groups in the presence of calcium salt as catalyst.

2. A process in accordance with claim 1, wherein the low molecular weight 1,2-epoxy resin is a polyglycidyl ether of a dihydric phenol.

3. A process in accordance with claim 1, wherein the low molecular weight 1,2-epoxy resin is a polyglycidyl ether of bis-(4-hydroxyphenyl)-dimethylmethane and the dihydric phenol is bis-(4-hydroxyphenyl)-dimethylmethane.

4. A process in accordance with claim 1, wherein less than one hydroxyl equivalent of the dihydric phenol per epoxide equivalent of the low molecular weight 1,2-epoxy resin is used.

5. A process in accordance with claim 1, wherein the calcium salt is employed in a range to yield about 20 to 600 parts per million of calcium ion based on the weight of the dihydric phenol employed.

6. A process in accordance with claim 5, wherein the range is from about 40 to about 240 parts per million of calcium ion based on the weight of the dihydric phenol employed.

7. A process in accordance with claim 1, wherein the calcium salt is calcium chloride.

8. A process in accordance with claim 1, wherein the reactants are heated to a temperature from about 140° to 195° C. until the hydroxyl groups of the dihydric phenol are substantially consumed.

9. A process in accordance with claim 1, wherein the reactants are heated to a temperature from about 160° to 195° C. until shortly before the hydroxyl groups are consumed, and subsequently the reaction is completed at a lower temperature.

10. A composition capable on heating of forming high molecular weight, substantially linear 1,2-epoxy resins having an epoxy equivalency greater than 1, said composition consisting of a low molecular weight epoxy resin having an epoxy equivalency greater than 1, a dihydric phenol free from reactive groups other than phenolic hydroxyl groups, and a calcium salt.

11. A composition in accordance with claim 10, wherein the calcium salt is employed in an amount to yield about 20 to 600 parts per million of calcium ion based on the weight of the dihydric phenol.

12. A composition in accordance with claim 11, wherein the calcium salt is present in an amount to yield about 40 to about 240 parts per million of calcium ion based on the weight of dihydric phenol.

References Cited by the Examiner

UNITED STATES PATENTS

| | | | |
|---|---|---|---|
| 2,592,560 | 4/1952 | Greenlee | 260—2 |
| 2,803,609 | 8/1957 | Schlenker | 260—47 |
| 3,018,262 | 1/1962 | Schroeder | 260—2 |

WILLIAM H. SHORT, *Primary Examiner.*

T. D. KERWIN, *Assistant Examiner.*